Nov. 2, 1948.  W. O. SCHULTZ  2,452,872
COMBINED FUSE AND DEMAND METER
Filed Aug. 5, 1947  2 Sheets-Sheet 1

INVENTOR.
William O. Schultz
BY
Arthur R. Woolfolk
Attorney

Nov. 2, 1948. W. O. SCHULTZ 2,452,872
COMBINED FUSE AND DEMAND METER
Filed Aug. 5, 1947 2 Sheets-Sheet 2

INVENTOR.
William O. Schultz
BY
Arthur R. Woolfork
Attorney

Patented Nov. 2, 1948

2,452,872

UNITED STATES PATENT OFFICE 2,452,872

COMBINED FUSE AND DEMAND METER

William O. Schultz, South Milwaukee, Wis., assignor to Line Material Company, Milwaukee, Wis., a corporation of Delaware Application August 5, 1947, Serial No. 766,300

5 Claims. (Cl. 171—34)

In distribution systems it is desirable to know the load being carried by a transformer, particularly the maximum load. Heretofore it was necessary to open the line and insert what is known as a demand meter in the circuit as a temporary installation. This caused interruption of the service. Another method that has been followed was to employ a so-called clip-on ammeter which usually had a split core transformer which could be opened up and hooked around the line conductor. This transformer had a secondary connected to a meter to indicate the maximum current flowing. Neither of these methods were wholly satisfactory and each required a considerable amount of work to make the temporary installation and to later remove it.

This invention is designed to provide a means of utilizing a portion of the fuse structure which is almost always found on the primary side of the transformer so that it is not necessary to open the line and disrupt the service or to do any material amount of work but which merely requires the operator to substantially instantly substitute a combined fuse and demand meter for the conventional fuse and thus maintain the protection afforded by the fuse and at the same time have a demand meter in the line to register the peak load on the transformer.

In greater detail, further objects are to provide a fuse-door assembly for a housed fuse construction in which a demand meter is carried by the door on its outer side and connected in series with a fuse link located within a fuse tube carried on the inner side of the door and arranged so that the fuse tube, demand meter and door assembly can be substantially instantly substituted for the conventional fuse tube and door assembly.

Further objects are to provide a fuse tube, demand meter and door assembly for a housed type fuse construction in which certain of the contacts of the fuse tube not only play their usual role but are also utilized as supporting rigid members for elements of the demand meter to thereby eliminate the need for additional conductors to connect the fuse link and demand meter in series and also to materially reduce the number of separate parts required.

Further objects are to provide an effective means in a thermally responsive demand meter to compensate for ambient temperature without requiring one thermal element to work against, or oppose another thermal element to thus secure a more accurate indication or reading of the demand meter than would otherwise be the case, and to so organize or arrange the parts of the demand meter that they will directly coact with elements of the fuse tube to minimize the number of connections required.

An embodiment of the invention is shown in the accompanying drawings, in which—

Figure 1:
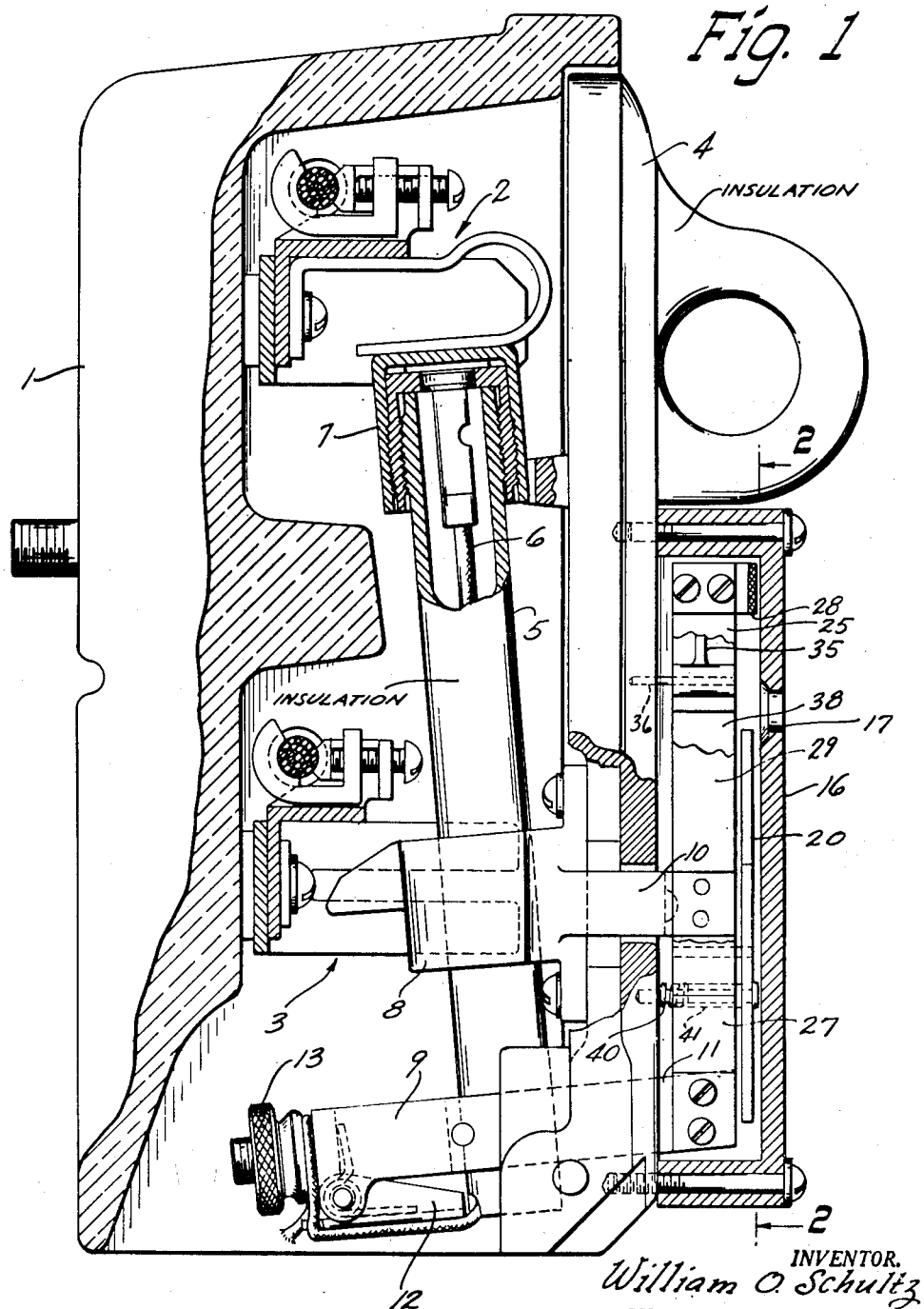
Figure 1 is a side elevation of the device partly in section and partly broken away.

Referring to the drawings, it will be seen that the device comprises a casing 1 of porcelain or other suitable insulating material which is adapted to removably receive doors provided with fuses. The casing is provided interiorly with an upper contact or terminal 2 and a lower contact or terminal 3 adapted to receive conductors.

In practicing this invention, the usual door and fuse tube assembly is removed and in place of this the new door, fuse tube and demand meter assembly is substituted. The door is indicated at 4 and is of insulating material and is provided with any suitable type of fuse tube 5 provided with a fuse link 6 of any suitable construction. The fuse tube 5 is provided with an upper contact 7, an intermediate contact 8 and a lower contact 9. It is to be noted that the intermediate contact 8 and the lower contact 9 are provided with integral projections 10 and 11, respectively, which extend through openings in the front of the door and project outwardly beyond the front of the door. The upper contact 7 and the intermediate contact 8, respectively, engage the stationary upper and lower contacts 2 and 3. The fuse link 6 electrically connects the upper and lower contacts 7 and 9 of the fuse tube 5. The fuse link 6 may extend over a throwout or flip-out lever 12 and may be secured to the lower contact 9 by means of a thumb nut 13.

It is preferable to provide the door 4 with trunnions 14 which are removably received in hook supports 15 carried by the housing 1.

A demand meter is located on the outer side of the door 4. The demand meter comprises a casing 16 provided with an arcuate cutout 17 which is equipped with a transparent window 18. This window is provided with graduations or numbers 19, and a pointer 20 formed of insulation and located interiorly of the casing is arranged to indicate the current flowing through the apparatus and is provided with a reset tongue 21.

The casing 16 of the demand meter houses all portions thereof with the exception of the small tongue or finger formed integrally with the pointer 20. This tongue projects through a slot 22 formed in the casing 16 of the demand meter and is used to reset the demand meter as the demand meter is a peak value demand meter and the pointer remains at the position corresponding to peak value unless manually reset. The pointer 20 is pivoted as indicated at 23 and is provided with a cutout portion 24.

A main bimetal strip 25 is anchored to a bracket 26 and connected by means of the conducting arm 27 with the forwardly projecting portion 11 of the lower contact 9. The upper or free end of the bimetal strip 25 is connected by means of a flexible conductor 28 with the free end of a spring strip 29. The lower end of the spring strip 29 is rigidly anchored to the forwardly projecting portion 10 of the intermediate contact 8 of the fuse tube. The free end of the spring 29 is provided with a lug 30 to which a pair of insulating links 31 are pivoted. The outer ends of the links 31 are rounded and bear against the free end of the bimetal member 25. The free end of the bimetal strip 25 is provided with clamping plates 32 to clamp the flexible conductor 28 to such free end. Similarly, the free end of the spring strip 29 is provided with clamping plates 33 and 34 to clamp the other end of the flexible conductor 28 to the free end of the spring strip 29, the plate 34 it being noted being integral with the lug 30.

A lever 35 is pivoted as indicated at 36 and is also pivoted to the insulating links 31 as indicated at 37. This lever rigidly carries the upper end of a compensating bimetal strip 38, the free end of the bimetal strip being provided with an outwardly projecting pin or finger 39 which is positioned within the opening 24 of the pointer 20 and is arranged to rock the pointer upon operation of the device. The members 35 and 38 constitute a lever having a rigid arm pivoted to the links 31 and a bimetal long arm.

Figure 2:
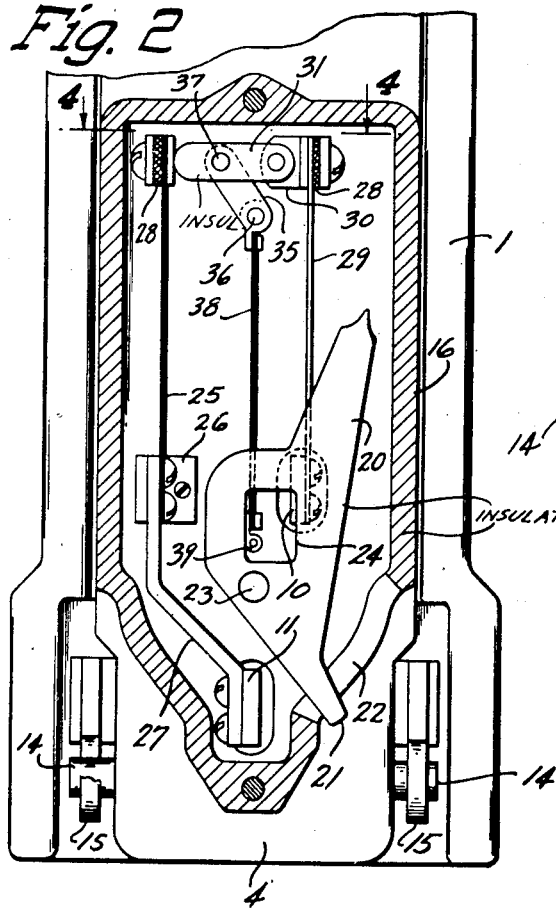
Figure 2 is a fragmentary sectional view on the line 2—2 of Figure 1.
Figure 3:
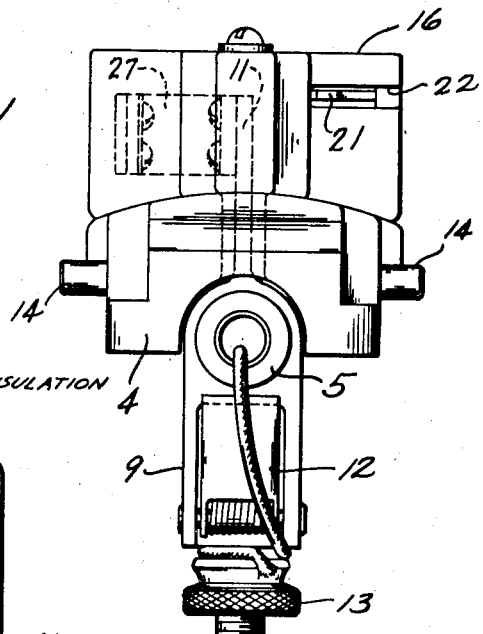
Figure 3 is a bottom view of the door with the fuse tube and demand meter with the casing omitted.
Figure 5:
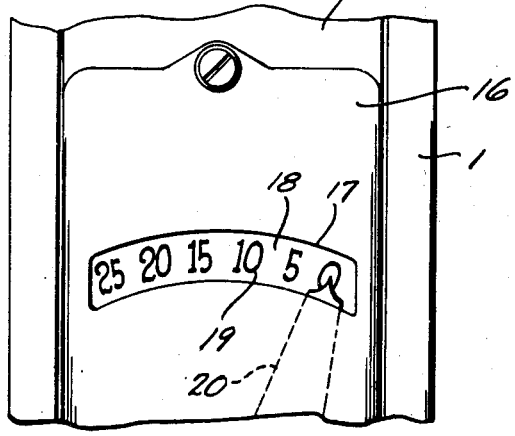
Figure 5 is a fragmentary front view of the device.
Figure 4:
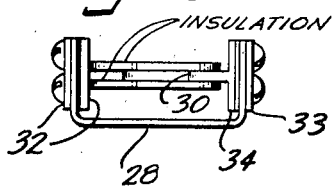
Figure 4 is a line section on the line 4—4 of Figure 2.

It is apparent that the current passes from the upper terminal or contact 2 through the fuse link 6 to the lower contact 9. From this point the current passes through the main bimetal strip 25 and returns through the spring strip 29 to the intermediate contact 8 of the fuse tube which is in engagement with the lower stationary contact 3 of the housing. The spring strip 29 keeps the free rounded ends of the insulating links 31 in engagement with the free end of the bimetal strip 25. It is apparent that when the bimetal strip 25 is deflected to the right as viewed in Figure 2 upon the passage of current therethrough, that the link mechanism will transmit motion to the lever composed jointly of the arm 35 and the bimetal strip or long arm 38, and thus will move the pointer to the left. The bimetal strip 38 is arranged to compensate for ambient temperature. As it heats up due to the surrounding heated air it will move to the right. It is to be noted that the motion of the bimetal strip 25 to the right is caused jointly by the heat generated by the passing current and also by the ambient temperature, and consequently it moves a certain distance farther to the right than would be caused by the current alone. The bimetal strip 38 moves its free end a distance to the right to correct for ambient temperature. The motion of the pin 39 to the left is dependent solely on the heat generated by the passage of current through the bimetal member 25. The demand meter, therefore, indicates and registers the peak current passing through the device. A light drag spring 40 lightly holds a sleeve 41 against the pointer, see Figure 1, and prevents the pointer from shifting back due to vibration.

It is apparent that in using the device the service is interrupted only for the very briefest period. All that is necessary is to take the standard fuse tube and door assembly off and substitute for it the new door, fuse tube and demand meter assembly. This only takes an instant and the service is immediately restored.

It will be seen further that protection of the line is maintained due to the fact that the structure includes not only the demand meter but also a protecting fuse.

Although this invention has been described in considerable detail it is to be understood that such description is intended as illustrative rather than limiting, as the invention may be variously embodied and is to be interpreted as claimed.

I claim:

1. In a device of the class described, a housing having an upper and a lower stationary contact, said housing having means for removably receiving doors provided with fuses, a door arranged to be received by said housing, a fuse tube carried on the inner side of said door and having an upper, a lower, and an intermediate contact with the upper and intermediate contacts arranged to respectively engage the upper and lower stationary contacts when the door is in closed position, a fuse link within said fuse tube electrically connecting the upper and lower contacts of said fuse tube, a demand meter located on the outer side of said door and including a bimetal strip and a yielding conducting strip having free ends electrically connected together, the intermediate contact of said fuse tube having a portion projecting through said door and constituting a rigid support for the other end of said yielding conducting strip, the other end of said bimetal strip being rigidly held and being electrically connected to the lower contact of said fuse tube, and registering means actuated by said bimetal strip.

2. In a device of the class described, a housing having an upper and a lower stationary contact, said housing having means for removably receiving doors provided with fuses, a door arranged to be received by said housing, a fuse tube carried on the inner side of said door and having an upper, a lower, and an intermediate contact with the upper and intermediate contacts arranged to respectively engage the upper and lower stationary contacts when the door is in closed position, a fuse link within said fuse tube electrically connecting the upper and lower contacts of said fuse tube, a demand meter located on the outer side of said door and including a bimetal strip and a yielding conducting strip having free ends electrically connected together, the intermediate contact of said fuse tube having a portion projecting through said door and constituting a rigid support for the other end of said yielding conducting strip, the lower contact of said fuse tube having a portion projecting through said door and electrically connected to the other end of said bimetal strip, and registering means actuated by said bimetal strip.

3. In a device of the class described, a housing having an upper and a lower stationary contact, said housing having means for removably receiving doors provided with fuses, a door arranged to be received by said housing, a fuse tube carried on the inner side of said door and having an upper, a lower, and an intermediate contact with the upper and intermediate contacts arranged to respectively engage the upper and lower stationary contacts when the door is in closed position, a fuse link within said fuse tube electrically connecting the upper and lower contacts of said fuse tube, a demand meter located on the outer side of said door and including a bimetal strip and a resilient conducting strip having free ends electrically connected together, the intermediate contact of said fuse tube having a portion projecting through said door and constituting a rigid support for the other end of said resilient conducting strip, the other end of said bimetal being rigidly held and being electrically connected to the lower contact of said fuse tube, link means interposed between the free ends of said bimetal strip and said resilient conducting strip, a pivoted lever having a short arm connected to said link means and having a long arm, and a registering pivoted pointer actuated by the long arm of said lever.

4. In a device of the class described, a housing having an upper and a lower stationary contact, said housing having means for removably receiving doors provided with fuses, a door arranged to be received by said housing, a fuse tube carried on the inner side of said door and having an upper, a lower, and an intermediate contact with the upper and intermediate contacts arranged to respectively engage the upper and lower stationary contacts when the door is in closed position, a fuse link within said fuse tube electrically connecting the upper and lower contacts of said fuse tube, a demand meter carried by said door and including a bimetal strip having a fixed end electrically connected to the lower contact of said fuse tube, a resilient conducting strip having a fixed end electrically connected to the intermediate contact of said fuse tube, said bimetal strip and said resilient strip having free ends electrically connected together, link means interposed between the free ends of said bimetal strip and said resilient strip, a pivoted pointer, and a pivoted lever having a short arm connected to said link means and having a long arm composed of bimetal and arranged to actuate said pointer, the long arm of said lever being arranged to correct for ambient temperature.

5. An electrical demand meter comprising substantially parallel strips having adjacent fixed ends and adjacent free ends with the free ends electrically connected, one of said strips being formed of bimetal and the other of resilient metal, link means interposed between the free ends of said strips and pivoted to one of said strips, terminals connected to the fixed ends of said strips, a pivoted registering pointer, and a pivoted lever having a short arm connected to said link means and having a long arm composed of bimetal and arranged to actuate said pointer, said long arm being arranged to correct for ambient temperature.

WILLIAM O. SCHULTZ.

No references cited.